May 7, 1968   C. BROWN ET AL   3,381,472
HYDROSTATIC TRANSMISSION APPARATUS
Filed July 13, 1966   6 Sheets-Sheet 5
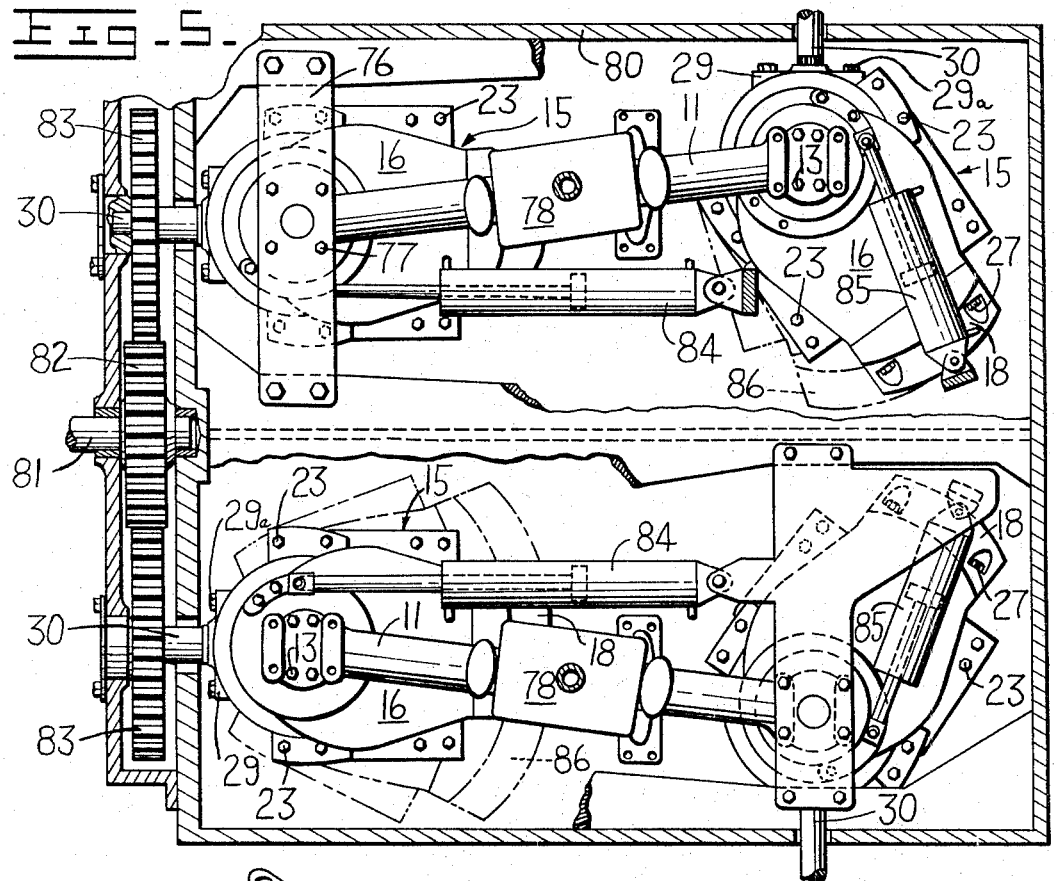
INVENTORS
Charles Brown
William K. Engel
Rollin P. VanZandt
ATTORNEYS May 7, 1968  C. BROWN ET AL  3,381,472
HYDROSTATIC TRANSMISSION APPARATUS
Filed July 13, 1966  6 Sheets-Sheet 6
Fig-7-
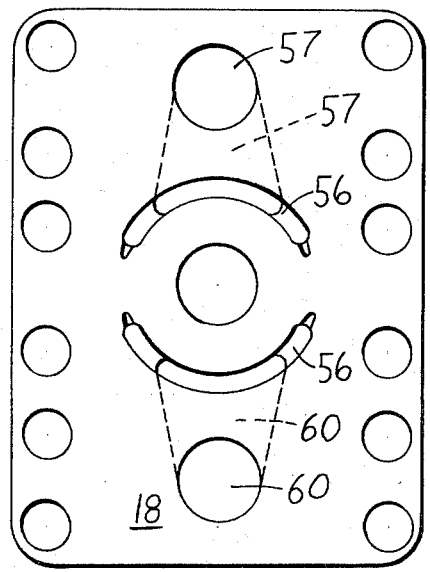
INVENTOR.
Charles Brown
William K. Engel
Rollin P. VanZandt
BY
ATTORNEYS

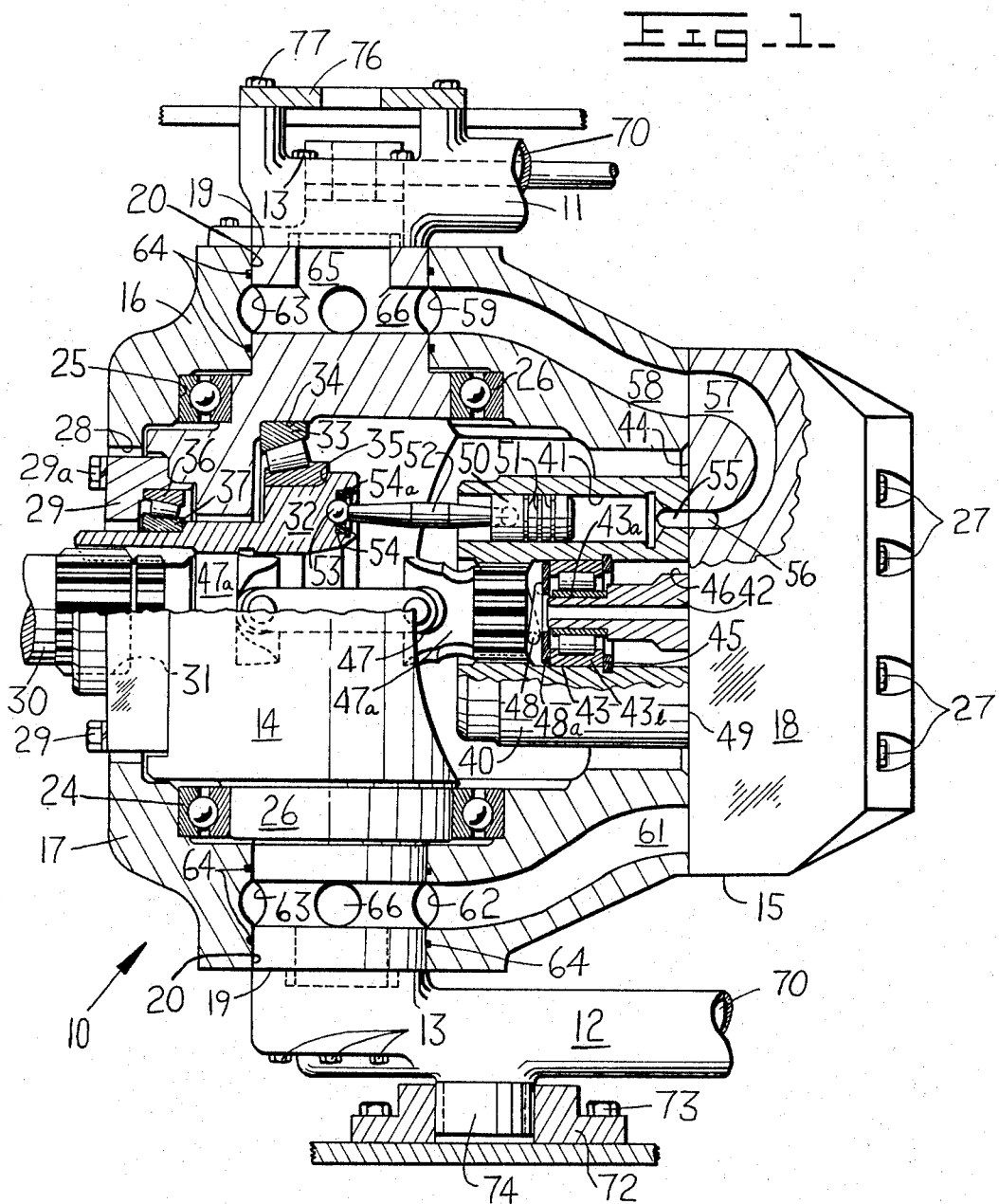

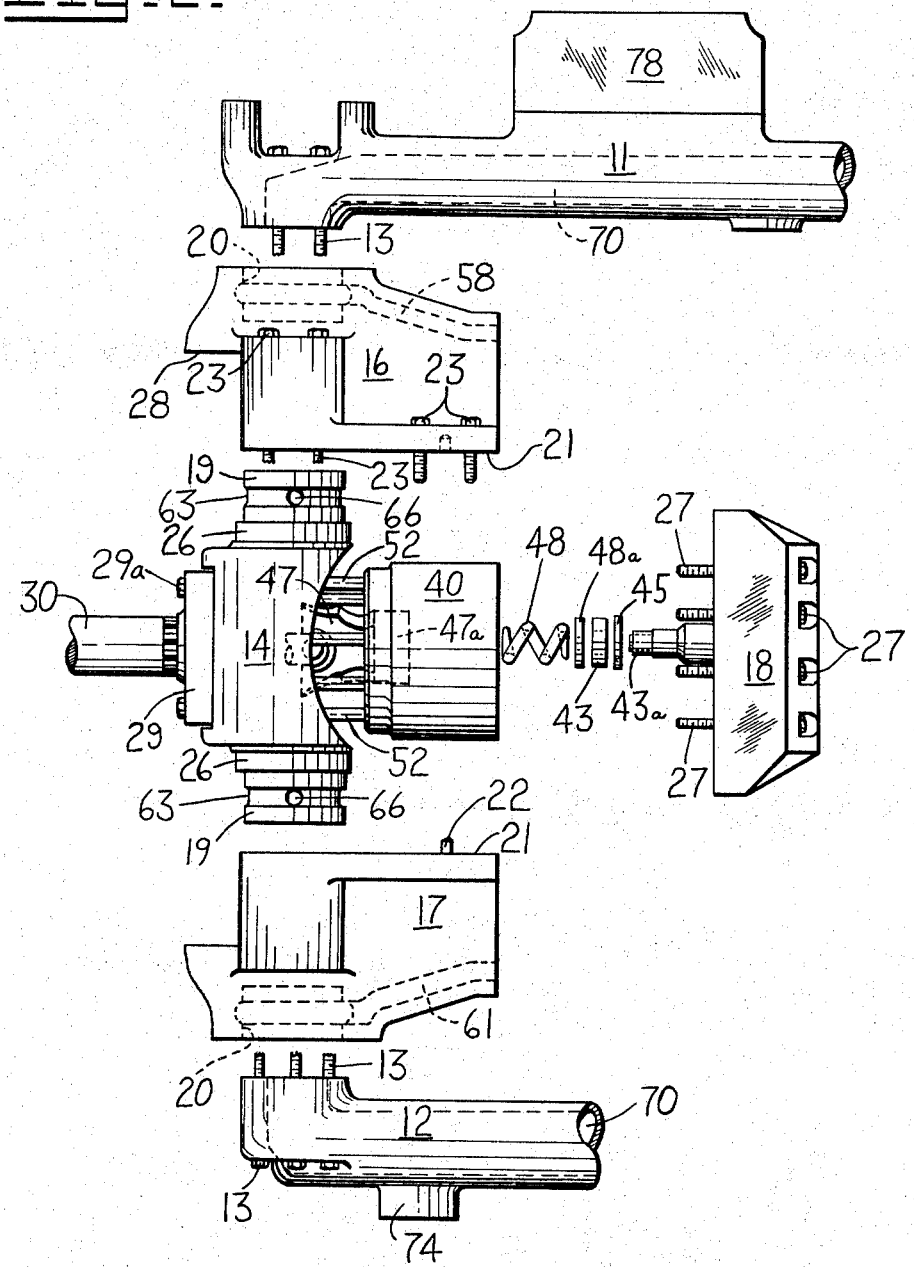

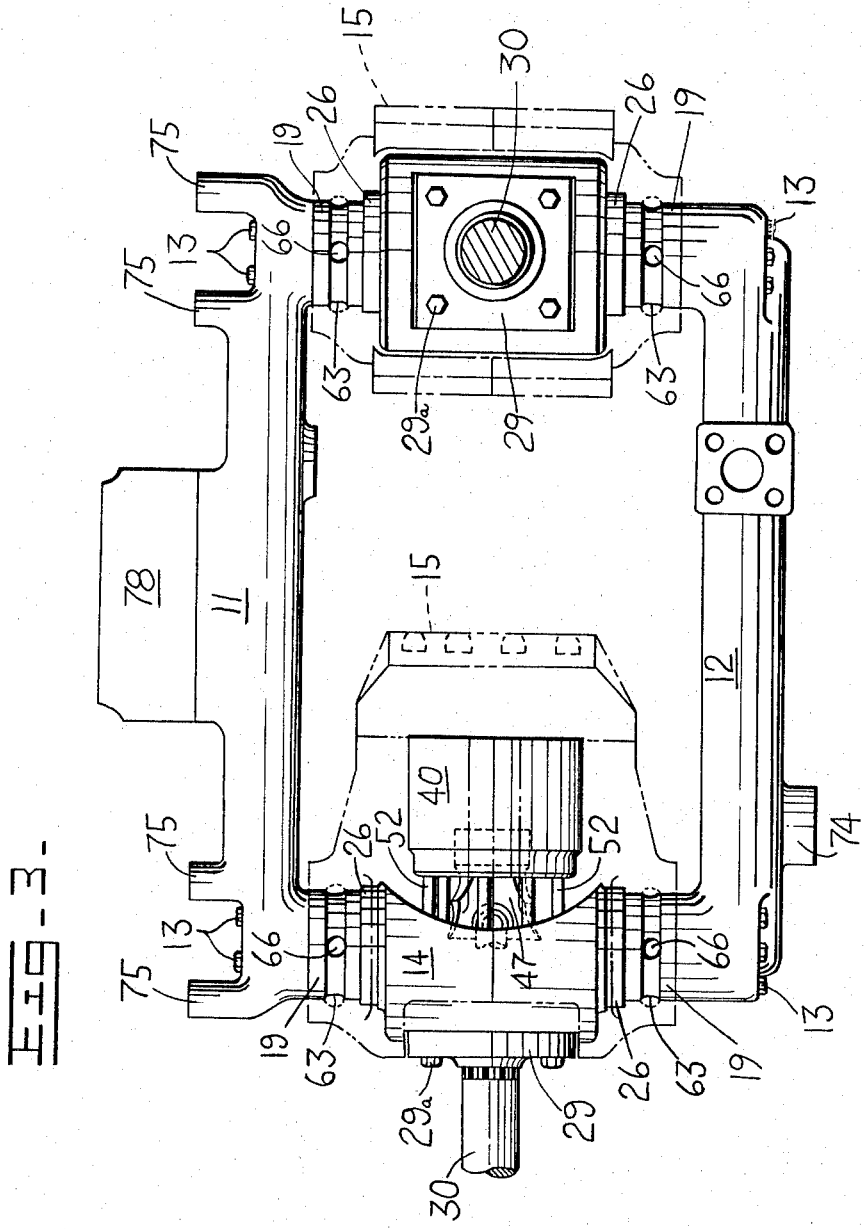

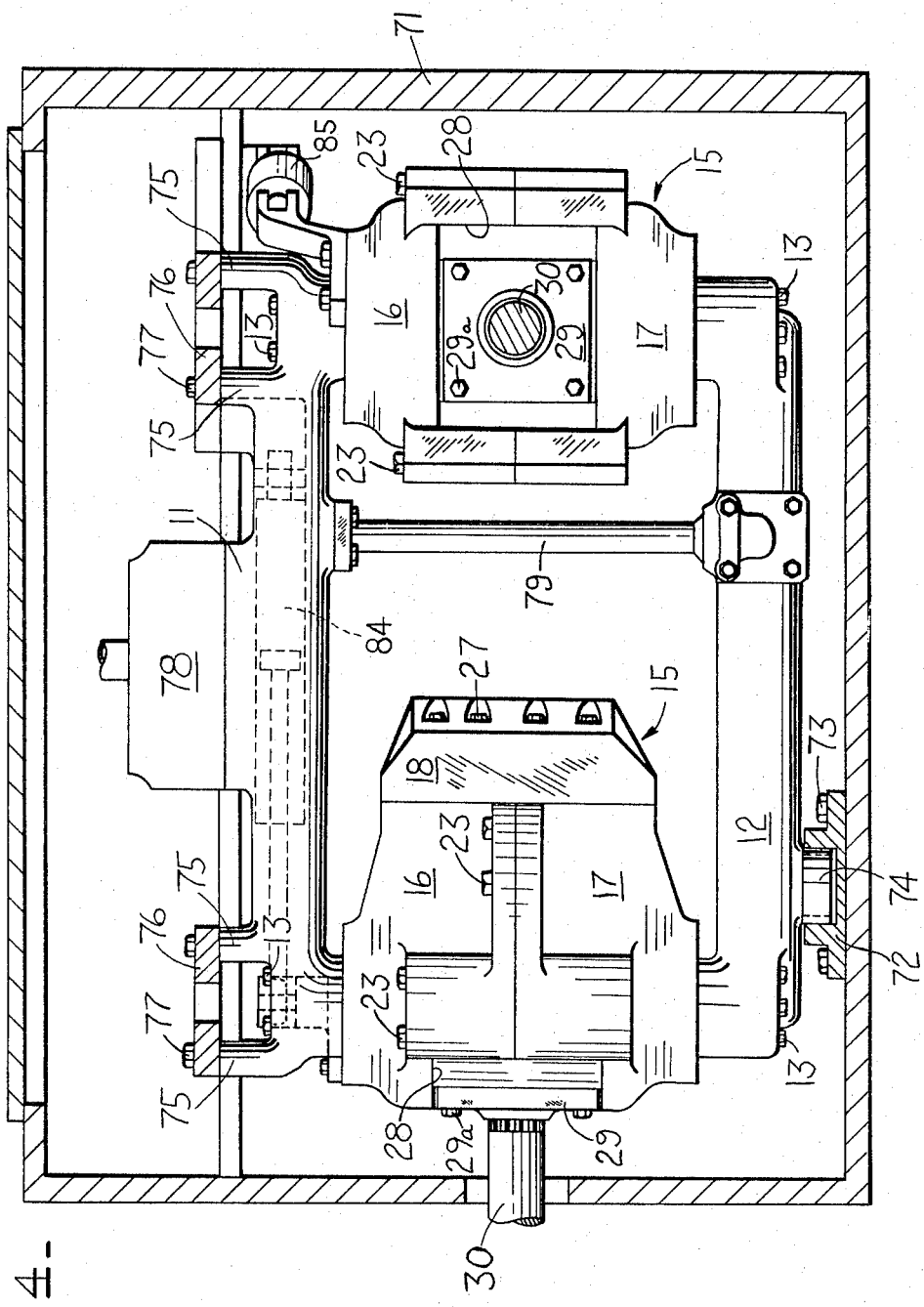

United States Patent Office 3,381,472
Patented May 7, 1968

3,381,472
HYDROSTATIC TRANSMISSION APPARATUS
Charles Brown, New Port Richey, Fla., and William K. Engel and Rollin P. Van Zandt, Peoria, Ill., assignors to Caterpillar Tractor Co., Peoria, Ill., a corporation of California
Filed July 13, 1966, Ser. No. 564,875
9 Claims. (Cl. 60—53)

ABSTRACT OF THE DISCLOSURE

An improved hydrostatic translating unit (variable displacement pump or motor) can be made by fabricating a unitary trunnion structure which extends through the unit, journalling a thrust plate and power shaft centrally on the trunnion, and swingably mounting a pump case at opposite ends of the trunnion so a cylinder block supported in the pump case will change in angular relationship to the thrust plate as the pump case swings whereby pistons in the cylinder block connected to the thrust plate with links will change their effective strokes. The unitary trunnion supports the unit, usually through manifold assemblies rigidly connected to the projecting ends of the trunnion. This allows the units to be coupled into a rigid loop to form a fluid power system without slip joints or similar devices to compensate for thermal and pressure distortion.

---

This invention relates to hydrostatic transmission systems wherein the power output of a prime mover is transmitted to the powered equipment via fluid pressure through a hydraulic loop, and more particularly, to fluid translating units and apparatus suitable for such transmission systems.

Hydrostatic transmission systems have been employed in a variety of circumstances and provide a power transmission system wherein there is no direct mechanical connection between the power source and the powered equipment. One of the principal advantages of these systems is that it is possible to achieve an infinitely variable ratio between the speed of the power source and the speed of the powered equipment without substantial power loss. Thus, these systems are superior to gear transmissions wherein only fixed, stepped ratios are available. Further, transmissions of this type can produce as much draw bar pull as a manual shift with a clutch and the same maximum speed as well.

A basic hydrostatic transmission consists of a hydraulic pump which is driven by the prime mover and a hydraulic motor which is driven by the fluid pressure, delivered through conduits, from the pump. Usually the pump is of the variable displacement type and by controlling the displacement of the pump from zero to a maximum in either direction the speed of the motor is controlled over a broad speed range in either direction. The motor also may be of the variable displacement type to facilitate a wide range of transmission speed ratios at full input power at high efficiences. Since the terms hydraulic pumps and motors relate to the particular function for which the unit is being employed, the more general term of fluid translating device or unit will be often used in the description for referring to a unit which could function either as a pump or motor.

Hydrostatic drives are now being employed in vehicles to provide a power transmission system between the prime mover and driving elements of the vehicle, such as wheels, tracks and the like. Such transmission systems can merely replace the standard gear transmission in a vehicle or alternatively can be used to replace much of the conventional drive train used in today's vehicles, such as the clutch, torque converter, gear transmission, drive shaft and differential, and even the braking equipment in some cases.

Employed in either way the infinitely variable ratio of speeds between that of the prime mover and the driving elements of a vehicle obtained through the use of a hydrostatic transmission manifestly improves vehicle performance. When hydrostatic transmission systems are employed in track-type vehicles, features heretofore not readily obtainable with such vehicles are available. Besides providing stepless variation in transmission setting completely independent of engine speed, the hydrostatic transmission in track-type vehicles allows fewer and low-effort controls, independent control of tracks in either direction for easier and more precise steering, high efficiency and many other advantages.

One of the difficulties in incorporating hydrostatic transmission systems into tractor vehicles, such as the track-type, where large amounts of power must be transmitted to the driving elements of a vehicle for the necessary draw bar pull, is the lack of suitable fluid translating apparatus which is capable of withstanding the high pressures, and distortive forces developed in such applications.

Accordingly, it is an object of this invention to provide a rugged fluid translating unit for hydrostatic drives, as well as other applications, which is lightweight, small, compact and capable of satisfactory operation over a long and useful life at extremely high pressures and speeds.

It is also an object of the present invention to provide an improved, variable displacement fluid translating unit with a minimum number of parts.

Another object is the provision of translating units which can be conveniently joined to conduit and supporting structures through a strong unitary trunnion structure which is capable of carrying the unit and also forming part of the physical support structure.

Still another object of the present invention is the provision of a translating unit which is capable of operating at high pressures without substantial internal distortion.

A more specific object is the provision of fluid translating units for pump-motor combinations which can be handled as a rigid unit and installed and serviced as such in tractor-type vehicles.

Many of the above objects, and others which will be apparent from the description of this invention, can be accomplished by a fluid translating unit of the axial piston, positive displacement type having a unitary, post-like support trunnion extending therethrough which carries a transverse power shaft and a thrust plate connected to the power shaft, and has a composite case body containing the cylinder barrel fitted over the ends of the trunnion and swingable thereon to vary the displacement, with the trunnion also providing passages for fluid ingress and egress at its respective ends. More specific objects can be accomplished by connecting two such units together in rigid assemblies having conduit manifolds connecting to their respective ends to form a hydraulic loop for a pump-motor combination necessary for a hydrostatic transmission.

The invention will be better understood by referring to the following specification wherein reference is made to the accompanying drawings, wherein:

FIG. 1 is an elevation partly in section of the novel translating unit of this invention with parts broken away to show internal details;

FIG. 2 is an exploded view of the translating unit shown in FIG. 1;

FIG. 3 is an elevation of the trunnions of two translating units connected in a rigid loop with conduit manifolds with broken lines indicating the positions of the case bodies of the respective units;

FIG. 4 is an elevation of the connected translating units shown in FIG. 3 with their associated case bodies included and mounted in a transmission case;

FIG. 5 is a plan view of dual pairs of translating units mounted side by side in a transmission case for individual articulation of driving elements on opposite sides of a vehicle;

FIG. 6 is a perspective of the translating unit shown in FIG. 1 with parts broken away; and FIG. 7 is a plan view of the valve face of the cylinder head of the case body.

More specifically, the translating units of this invention are axial piston, positive displacement types. A translating unit of this general character is shown in U.S. Patent 2,525,979, issued to Vickers. However, there is a substantial structural difference between the translating unit of this invention and those known in the prior art. A primary distinction resides in the multi-functional unitary trunnion structure of the novel translating units of this invention. This post-like trunnion structure completely supports all parts of the unit and also provides an integral conduit for fluid ingress and egress to the unit. The importance and value of this unitary trunnion structure will become more apparent in the complete description of the invention. One important feature is that the strong unitary trunnion can be incorporated in other structures without danger of distorting the unit from loads induced on it through such attachments.

The improved design of this invention provides a structure wherein a unitary trunnion structure resists the distortional loads generated by the high fluid pressures and temperature differentials in a manner that only a minimum of distortion will occur within the unit which avoids wear of the moving parts, and gives improved service life. It reduces the number of internal seals required to prevent leakage by its unique design. Further, it eliminates the need for precise location of pump and motor to register with connecting manifolds or the alternate necessity of requiring slip joints in this piping to accommodate inaccuracy in location of pump and motor.

In FIG. 1 the internal detail of this novel translating unit 10 can be seen. Basically the unit is designed to be mounted by rigidly suspending it by its trunnion, such as within a support manifold having an upper conduit 11 and a lower conduit 12 by cap screws 13 which are screwed axially into the ends of the unitary trunnion 14. Actually the unitized connection of the trunnion in the manifold can better be seen in FIG. 2 where the exploded view shows how the trunnion is incorporated into the manifold. While a pipe manifold is shown for illustration, numerous other types of manifold structures can be employed which can actually be parts of other structures since the unitary trunnion is capable of serving as part of the supporting structure and loading of the trunnion will not cause any distortion within the unit.

All the parts of the translating unit are carried by or supported on the post-like trunnion which can be suspended in a suitable manifold loop as mentioned above. The case body 15 of the unit is composed of three parts, the upper case 16, the lower case 17, and the cylinder head 18. As can be seen in FIG. 2, the upper and lower cases are fitted on the opposite ends 19 of the trunnion prior to its assembly in the manifold and the ends of the trunnion are received in apertures 20 in the cases provided for this purpose. The upper and lower cases are assembled on the trunnion so their respective flange sections 21 are closed together, aligned by tapered dowel pins 22, with cap screws 23 used to secure the cases together as a hollow shell unit.

When the upper and lower cases are joined together with the cap screws assembled on the trunnion 14, they are carried in a swingable relationship as a unit about the axis of the trunnion on suitable bearings 24 adjacent to each end of the trunnion which fit between the case body 15 and the trunnion in bearing grooves 25 and 26 in the case body and trunnion, respectively, provided for this purpose. With the hollow shell formed by the upper and lower cases assembled on the trunnion, as described above, the cylinder head 18 is bolted to the shell with cap screws 27 to complete the case body. At the end of the case body opposite the head, an aperture 28 is provided so that the case body can be swung about the trunnion axis to a limited degree without interference with the bearing block 29 carrying power shaft 30 which is mounted centrally on the trunnion with its axis transverse to the axis of the trunnion. This bearing block also acts as a stop limiting the swing of the body in either direction.

Like the case body 15, the power shaft 30 is supported solely by the unitary trunnion as can be seen by the breakaway of parts shown in FIG. 1. In the embodiment shown in this figure, the splined power shaft is received into a splined sleeve 31 which is part of the thrust plate 32. Within the trunnion, the disc-shaped thrust plate is mounted for rotation on two tapered bearings which are orientated to take high loads induced on the thrust plate during operation of the unit. The inner bearing 33 fits in the space between a recess 34 in a hollow central portion of the trunnion and a radial flange 35 on the periphery of the thrust plate so that the tapered rollers are oriented to absorb thrust loads into the bearing. The outer bearing 36, oriented reverse to the inner bearing, abuts on a shoulder 37 on the splined sleeve 31 of the thrust plate and is held against the shoulder by the bearing block 29 fastened to the trunnion with cap screws 29a which completes the rotational support structure for the thrust plate within the trunnion.

Within the case body 15, the mounting of the cylinder barrel 40 containing a plurality of axially disposed bores 41 can be best seen in FIG. 1. It is rotatably carried on a stub shaft 42 which is fixedly mounted in the cylinder head 18 and is supported thereon by cylinder bearing 43. The inner race 43a of the cylinder bearing is pressed on the end of the stub shaft and the outer race 43b and bearings are free to move axially on the inner race on the stub shaft. However, the outer race of the bearing is retained against outboard movement, i.e., toward the valve plate 44 of the cylinder head by abutment against snap ring 45 in the center bore 46 of the cylinder barrel.

The cylinder barrel is kept in time-rotational relationship with thrust plate 32 through a physical connection thereto by universal joint 47. This joint has splined connecting yoke shafts 74a at each end. One of the yoke shafts fits into the splined sleeve 31 of the thrust plate and the other is received in a splined portion of the center bore 46 of the cylinder barrel 40. A spring 48 is inserted between the end of the yoke shaft 47a retained in the bore 46 and is compressed against a washer 48a abutting on the outer race of bearing 43. The compression of the spring between the yoke shaft and the outer bearing race held by snap ring 45 pushes the valve face 49 of the cylinder barrel into the valve plate 44 of the cylinder head 18. This spring pressure holds the cylinder barrel against the valve plate as it is rotated, along with fluid pressure in the bores 41.

In each of the axially disposed bores 41 within the cylinder barrel 40, a piston 50 having circumferential balance grooves 51 is reciprocably disposed. The pistons are connected to thrust plate 32 by rods 52 which are retained in ball and socket joints 53 in the piston and the thrust plate. A bushing 54 and a snap ring 54a retain the ball ends of the rods within their respective connected parts.

Assembled as described above, when the case body 15 is swung about the axis of the unitary trunnion 14 on bearings 24, the cylinder block will assume an angular relationship to the thrust plate which, as the thrust plate and cylinder barrel rotate (when not axially aligned), will cause the pistons in the bores to reciprocate, thereby acting as a fluid pump or motor, depending upon the particular application of the unit.

As the pistons reciprocate within their bores as the barrel rotates, the volume of their respective bores will change and fluid communication is provided through bore ports 55 in the valve face 49 of the cylinder barrel for each bore 41. Ports 55 are adapted to register alternately with one or the other kidney-shaped ports 56 cut in the valve face 44 of the cylinder head 18 as the barrel rotates. The upper kidney-shaped port is connected via passage 57 in the cylinder head 18 and passage 58 in the upper case 16 to an annular recess 59 in aperture 20 encircling the upper end of the trunnion 14. Similarly connected is the lower kidney-shaped port via passage 60 in the cylinder head and passage 61 in the lower case 17 to annular recess 62 encircling the lower end of the trunnion.

In the embodiment of the invention shown in FIG. 1, the ends 19 of the trunnion contain grooves 63 which match with the annular recesses in the upper and lower cases to effect a toroidal-shaped channel around the trunnion ends through which fluid can pass circumferentially about the trunnion for balancing the hydraulic pressures developed in these passages and eliminating binding.

Fluid is prevented from escaping from the toroidal channels by seals 64 on either side thereof. To provide for fluid ingress and egress through the trunnion, each end of the trunnion has a blind axial bore 65 therein which is intersected by a transverse bore 66 disposed in grooves 63. One or more transverse bores may be used to increase the flow capacity. In this manner fluid may enter or leave the respective ends of the trunnion via the aforedescribed passages with one end acting as an inlet and the other as an outlet. It should be appreciated that the distortional loads developed within the translating unit are all absorbed in the trunnion structure by the novel design and that no fluid conduit connections to the translating unit other than those provided through the ends of the trunnion itself, are necessary.

One of the many substantial advantages of the unitary support trunnion of the translating units of this invention is illustrated in FIG. 3 wherein two translating units 10 have been connected through a rigid support manifold assembly. Actually the trunnion can be incorporated as part of the structural support of the manifold since it is a single post-like structure. The case bodies 15 of the two translating units have been removed (their normal positions are represented by broken lines) so that the completely rigid nature of the loop mounting can be seen. This manifold loop comprising the upper conduit 11 joined to the top of the trunnions of the two translating units, and lower conduit 12 joined to the opposite ends of the same trunnions, represents a typical assembly for a hydrostatic transmission wherein one of the translating units is used as a pump, and the other is used as a motor with pressurized fluid conducted from the pump through passage 70 to the motor and returned to the inlet of the pump through the passage in the opposite conduit manifold. Since the trunnions themselves are unitary rigid units, the relationship of the power shafts 30 of the respective translating units is always fixed when they are suspended separately or in a common conduit manifold. The latter assembly allows transmission units to be handled as a composite assembly which facilitates maintenance in vehicle installations. Further, this manifold loop assembly minimizes pressure and temperature distortion, simplifies fluid conduit connections, provides a compact mounting feature, allows compensation for high torques induced on or through the power shafts 30, and has a host of other advantages in high pressure operations not possible with the conventional translating units.

The ease and simplicity of mounting such loops in a vehicle is illustrated in FIG. 4 where a three-point suspension within a transmission case 71 is shown. The bottom of the manifold loop is laterally supported in a journal pad 72 which is bolted to the bottom of the transmission case with cap screw 73, and receives a dowel boss 74 which is an integral part of the lower conduit 12 of the manifold loop. Protruding mounting ears 75 at each end of the upper conduit 11 are bolted to spanning support plates 76 which extend transversely across the top of the transmission case with cap screws 77. It is also possible alternatively to attach the manifold loop at the top with a one point connection above the center of the manifold (such as above replenishing valve assembly 78) to minimize distortion of the manifold due to differences in temperature between it and the supporting structure. By making the power shafts 30 of the translating units splined and using adjustable slots for mounting the spanning support plates 76 and the journal pad 72, the manifold loop system shown in FIG. 4 can easily be installed in a vehicle with minimum regard to tolerances since they may be adjusted by positioning gears on the splined power shaft and positioning the whole assembly within the transmission case accordingly. Once the unit's position has been determined dowel pins can be provided so that it can be easily relocated if it is removed for service.

In FIG. 4 the replenishing valve assembly 78 of the manifold and the cross-over tube 79 associated therewith are shown. The purpose of the make-up and replenishing assembly and its cross-over tube are to provide additional hydraulic fluid which will be lost due to leakage within the translating units, and further, this assembly allows cooled hydraulic fluid—returned to pump via cooler—to be circulated in and out of the loop system in order to provide cooling for the units. In addition, any leakage from and around the units can be collected in the bottom of the transmission case which serves as the reservoir associated with the replenishing system (not shown).

A transmission case 80, containing a double set of paired translating units 10 connected in rigid manifold loops, is shown in FIG. 5 disposed side-by-side and driven by a common prime mover shaft 81 through gear 82. One translating unit in each manifold loop is driven through its power shaft 30 with its associated gear 83 which meshes with gear 82. This illustrates how conveniently the paired loops can be mounted in a transmission for a full hydrostatic drive and driven by a prime mover through a common shaft. This arrangement is suited for a track-type vehicle application in which a separate transmission is connected to each track on opposite sides of the machine offering individual track control. Varying the speed ratio between the transmissions can provide steering of the vehicle over an infinitely variable turning radius down to a spot turn when the tracks are counterrotating at equal speeds.

Also shown in FIG. 5 are hydraulic actuators 84 for varying the displacement of the translating units used as the pump and hydraulic actuators 85 which are connected to the translating units used as motors. Actuators 85 are used to vary the displacement of the motors by swinging the case bodies 15 about their respective trunnions by appropriate connection between the transmission case and the case body. Broken lines 86 in this figure indicate the swing positions of the pumps and motors which can be effected by their associated actuators.

For illustration, in one side of the transmission case, the pump is shown swung to either side of its zero displacement position, which gives fluid flow in opposite directions for controlling the direction of the motor, and on the other side of the transmission the motor has been swung in one diretction about its trunnion for speed changes since directional changes are accomplished by the pumps alone. The pumps in such loops can be positioned by their associated actuator to have from zero to full displacement possible in the translating unit, approximately 35° on each side of zero; however, the motors are swung in only one direction from a small displacement to a maximum of about 35°. It is through displacement control of both the pump and motor that a greater variety of speeds and torques can be achieved.

Another feature of the integrated manifold loop shown in FIG. 5 is the ability to connect the trunnions of the translating units in the manifold with their power shafts 30 at 90° relative to one another. This type of marrying eliminates the necessity of bevel gears and reduces the need for close tolerances within the transmission case. It also allows for compensation of errors in position caused by the "stack up" of clearances. Further, such a mounting better distributes the torque loads placed upon the manifold loop assemblies themselves.

It is not intended that the invention be limited by the above description, especially relative to the manifold structure, which can have a variety of shapes and sizes. What is important is that the trunnions of the pumps and motors of this invention can be physically integrated into the manifold structure as illustrated.

We claim:
1. An improved translating unit capable of high pressure operation comprising:
   (a) a unitary support trunnion extending transversely through said unit which serves as the mounting structure for said unit;
   (b) a thrust plate rotatably mounted in said trunnion with its axis of rotation transverse to the trunnion axis;
   (c) a power shaft connected to said thrust plate for rotation therewith;
   (d) a hollow case body swingably journalled on the ends of said trunnion and encasing the central portion of said trunnion;
   (e) a cylinder barrel having a plurality of axial bores rotatably mounted in said case body and swingable therewith;
   (f) a plurality of pistons reciprocably disposed in such bores and connected to said thrust plate by rod means;
   (g) a universal joint means rotatably connecting said thrust plate and said cylinder barrel whereby a timed, rotational relationship is maintained therebetween;
   (h) valve and passage means providing fluid ingress and egress to such axial bores enabling said unit to function as a fluid pump or motor; and
   (i) port means in the ends of said trunnion connected to said passage means whereby hydraulic fluid can enter or leave the unit, one end acting as the inlet and the other acting as the outlet.

2. The translating unit as defined in claim 1 wherein the plurality of axially disposed bores in the cylinder barrel are circumferentially spaced therein.

3. The translating unit as defined in claim 1 wherein the unitary support trunnion is a cylindrical post-like structure with axial bores in the ends thereof to provide fluid ingress and egress.

4. The translating unit as defined in claim 1 wherein the hollow case body is comprised of an upper case, a lower case and a cylinder head enabling it to be assembled on the unitary trunnion.

5. The translating unit as defined in claim 1 wherein the trunnion is cylindrical and relieved in its central portion for journalling the thrust plate and power shaft therein.

6. The translating unit as defined in claim 4 wherein the cylinder head contains a valve plate containing two arcuate ports and passages leading from said arcuate ports, through the upper and lower cases to the ends of the trunnion.

7. A hydraulic power loop for hydrostatic transmission comprising at least two fluid translating units each having a unitary post-like trunnion extending transversely therethrough, said trunnions having a thrust plate journal in the central portion and ports for fluid ingress and egress in their ends, and conduit manifolds directly to and across said ends of said trunnions to form a rigid hydraulic loop through which hydraulic fluid from the outlet of one translating unit may enter the inlet of another and return via the outlet of the latter to the inlet of the former, said conduit manifold including support means by which the loop and translating units can be mounted.

8. The hydraulic power loop as defined in claim 7 wherein each fluid translating unit includes:
   (a) a unitary support trunnion having the fluid ingress and egress ports at the ends thereof;
   (b) a thrust plate and power shaft journalled in the central portion of said trunnion for revolutions;
   (c) a hollow case body mounted swingably on said trunnion and enclosing its central portion;
   (d) a cylinder barrel having a plurality of axial bores circumferentially disposed therein mounted in said case body and swingable therewith;
   (e) flexible connecting means connecting said thrust plate and said barrel for timed rotational movement;
   (f) a plurality of pistons reciprocally disposed in said axial bores of said barrel and each connected to said thrust plate with rod means; and
   (g) passage means having communication with said axial bores and said ports at the ends of said trunnion whereby hydraulic fluid can pass through the translating unit when said cylinder barrel is angularly disposed to said thrust plate.

9. The hydrostatic loop as defined in claim 7 wherein the support means on the conduit manifolds include a mounting means adjacent to the upper end of the respective trunnions by which the loop may be suspended from overhead support structures and at least one attaching means between the lower ends of said respective trunnions to stabilize the loop.

References Cited
UNITED STATES PATENTS

| | | | |
|---|---|---|---|
| 2,967,395 | 1/1961 | Foerster | 60—53 |
| 3,142,963 | 8/1964 | Thoma | 60—53 |
| 3,318,092 | 5/1967 | Boydell | 60—53 |

EDGAR W. GEOGHEGAN, *Primary Examiner.*